United States Patent
Bradley et al.

(10) Patent No.: US 7,054,507 B1
(45) Date of Patent: May 30, 2006

(54) METHOD OF KERNEL SELECTION FOR IMAGE INTERPOLATION

(75) Inventors: Andrew Peter Bradley, Castlecrag (AU); Kai Huang, Cecil Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,178

(22) Filed: Dec. 17, 1999

(30) Foreign Application Priority Data

Dec. 18, 1998 (AU) .................................. PP7798

(51) Int. Cl.
*G06K 9/32* (2006.01)

(52) U.S. Cl. ................................................. 382/300

(58) Field of Classification Search ............... 382/300, 382/199, 205, 260, 263, 266, 308, 176, 299, 382/254, 267–269, 298; 345/667, 698; 358/1.2, 358/525, 528, 451; 348/441

See application file for complete search history.

(56) References Cited

U.S. PATENT DOCUMENTS

| | | | | |
|---|---|---|---|---|
| 5,008,752 A | * | 4/1991 | Van Nostrand | 348/581 |
| 5,054,100 A | * | 10/1991 | Tai | 382/300 |
| 5,125,042 A | | 6/1992 | Kerr et al. | 382/300 |
| 5,131,057 A | * | 7/1992 | Walowit et al. | 382/264 |
| 5,446,804 A | | 8/1995 | Allebach et al. | 382/298 |
| 5,740,284 A | * | 4/1998 | Wober et al. | 382/250 |
| 5,903,676 A | * | 5/1999 | Wu et al. | 382/244 |
| 6,208,763 B1 | * | 3/2001 | Avinash | 382/254 |
| 6,263,120 B1 | * | 7/2001 | Matsuoka | 382/300 |
| 6,408,109 B1 | * | 6/2002 | Silver et al. | 382/300 |

FOREIGN PATENT DOCUMENTS

| | | |
|---|---|---|
| EP | 0-908845 | 4/1999 |
| WO | WO 90/16035 | 12/1990 |
| WO | WO 96/16380 | 5/1996 |

OTHER PUBLICATIONS

U.S. Appl. No. 09/451,441, filed Nov. 30, 1999.
U.S. Appl. No. 09/454,964, filed Dec. 6, 1999.
U.S. Appl. No. 09/466,177, filed Dec. 17, 1999.
Robert G. Keys; "Cubic Convolution Interpolation for Digital Image Processing", IEEE Transaction on Acoustics, Speech, and Signal Processing, vol. ASSP-29, No. 6, Dec. 1981, pp. 1153-1160.

* cited by examiner

*Primary Examiner*—Vikkram Bali
(74) *Attorney, Agent, or Firm*—Fitzpatrick, Cella, Harper & Scinto

(57) ABSTRACT

A method of interpolating image data is disclosed. The method accesses a first set of discrete sample values of the image data and calculates kernel values for each of the discrete sample values using one of a plurality of kernels. The kernel is selected depending upon an edge orientation indicator, an edge strength indicator, and an edge context indicator for each of the discrete sample values. The calculated kernel values are convolved with the discrete sample values to provide a second set of discrete sample values.

21 Claims, 8 Drawing Sheets

  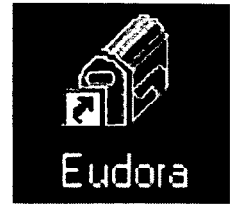
Fig. 7 (a) (b) (c)
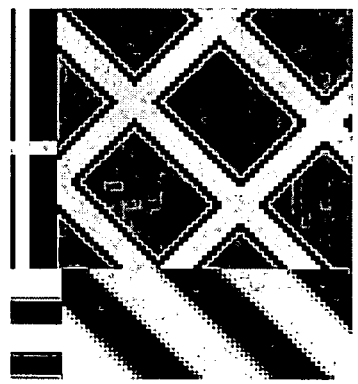 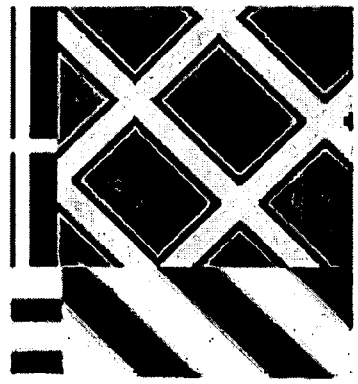
(a) (b)
Fig. 8
(a) (b)
Fig. 9

METHOD OF KERNEL SELECTION FOR IMAGE INTERPOLATION

FIELD OF INVENTION

The present invention relates to the field of resolution conversion of multi-dimensional digital data, for example digital image data.

BACKGROUND ART

There are several methods available for digital data resolution conversion. Popular methods are transform domain methods such as the fractional Fourier transform (fractional FFT or Chirp-Z transform), the discrete cosine transform (DCT), and discrete wavelet transform (DWT). In addition, there are a number of spatial domain methods such as re-sampling and digital filtering with finite-impulse response (FIR) and infinite-impulse response (IIR) filters and interpolation with continuous, usually cubic, splines. When a continuous kernel produces data that passes through original data points, it is often called an interpolating kernel. When the interpolated data produced is not constrained to pass through the original data points, it is often called an approximating kernel. There are a number of constraints that must be met in the design of these continuous kernels.

Commonly used continuous kernels for interpolation are the nearest neighbor (NN), linear, quadratic, and cubic kernels. The NN kernel is the simplest method of interpolation, which interpolates the image with the pixel value that is spatially nearest to the required one. This method works quite well when the scaling ratio is an integer multiple of the original data as it introduces no new values (i.e., no new colors) and preserves sharp edges. However, at other ratios the NN kernel has the disadvantage of shifting edge locations which often produces visible distortions in the output image, especially in images containing text or fine line details. Linear interpolation on the other hand allows for the introduction of new grey levels (or colors) that are effectively used to position edges at sub-pixel locations. This has the advantage of reducing the effect of shifted edge locations, however sharp edges can appear to be blurred. Quadratic and cubic interpolation provide steeper step responses and therefore less edge blurring, however, the steeper response results in an overshoot on either side of the edge. These overshoots can make the edges in natural images appear sharper, but on text, fine lines, or on other computer generated graphics these overshoots are clearly visible and detract from the perceived image quality and text legibility.

From the above, it can be concluded that each kernel has its own strengths and weaknesses. Further, there are certain image areas which are best interpolated using kernels of different shapes. Simply applying a single continuous convolution kernel at every image pixel will not satisfy all of the requirements for a general-purpose resolution conversion application.

One known method of generating a kernel with both a steep step response, but no overshoot is to adjust the parameters of the cubic kernel according to image information so as to remove the overshoot in the step response. The two-parameter Catmull-Rom cubic has a kernel of the form:

$$h(s) = \qquad (1)$$

$$\begin{cases} \left(2 - \frac{3}{2}b - c\right)|s|^3 + (-3 + 2b + c)|s|^2 + \left(1 - \frac{1}{3}b\right), & |s| \leq 1 \\ \left(-\frac{1}{6}b - c\right)|s|^3 + (b + 5c)|s|^2 + (-2b - 8c)|s| + \left(\frac{4}{3}b + 4c\right), & 1 < |s| \leq 2 \\ 0, & \text{Otherwise} \end{cases}$$

Popular choices for the parameters b and c are (b=0, c=0.5), which is the interpolating cubic that agrees with the first three terms of the Taylor series expansion of the original image, and (b=1, c=0) which is the approximating cubic B-sp line. One known method fixes the parameter b at b=0, whilst c is varied between 0, 0.5, and 1 dependent upon the edge strength measured using a Laplacian of Gaussian (LOG) edge detector. At a sharp edge c=0 the resulting cubic is:

$$h(s) = \begin{cases} 2|s|^3 - 3|s|^2 + 1, & |s| \leq 1 \\ 0, & \text{Otherwise} \end{cases} \qquad (2)$$

There is however, a problem with using this kernel to interpolate image data when the re-sampled pixel displacement is not significantly different from the original pixel displacement, say a re-sampling ratio of 10/11 or 11/10. In this instance pixels at the edges of text and other fine lines take on a grey value rather than the original black or white values. This again results in the blurring of sharp edges and a reduction in the observed image quality.

A further problem with the conventional continuous convolution kernel is associated with its application to edges at oblique orientations in the image plane. The conventional kernels can be either applied in separable fashion, ie., first to the rows of the image and then to the columns, or applied in a 2-dimensional form where they are directly convolved with the 2-dimensional image data. However, their orientations in these implementations are limited to either: horizontal, vertical, or symmetrical. Upon encountering an oblique edge, the pixels on either side of the edge are primarily used in the interpolation rather than pixels along the edge. This results in an interpolated edge that no longer appears to be clean and smooth, but appears to be jagged, or blurred, or both. A solution to the above problem is known whereby interpolation across edges is prevented by using extrapolated estimates of pixel values for pixels on the other side of the edge in the bilinear interpolation. However, this method requires highly accurate sub-pixel edge estimation at the output resolution and iterative post-processing using a successive approximation procedure. Both of the above-described methods place high demands on memory and processing resources. Another approach to the problem is to utilise a set of 2-dimensional "steerable" kernels that can be oriented along the line of an edge during image interpolation. In this way the method smooths along the edge line (to reduce edge jaggedness), but not across the edge (so preserving edge sharpness).

A method of selecting interpolation kernels based on edge strength, or user input in known. However, there are some defects that prevent this method from working optimally. Firstly, the use of edge strength alone as the basis for kernel selection does not provide sufficient information for reliable kernel selection (especially at oblique edges). Secondly, kernel selection based solely upon user input is impractical and does not specify the kernel selection in enough detail. For the example, in the sub-image shown in FIG. 7(a), there is not one single kernel that is ideal for the whole sub-image. In general, different kernels are required at a resolution that is impractical to be specified by a user.

It is an object of the present invention to ameliorate one or more disadvantages of the prior art.

SUMMARY OF THE INVENTION

According to one aspect of the present invention there is provided a method of interpolating a first set of discrete sample values to generate a second set of discrete sample values using one of a plurality of interpolation kernels, characterised in that said interpolation kernel is selected depending on an edge strength indicator, an edge direction indicator and an edge context indicator for each discrete sample value of said first set.

According to another aspect of the present invention there is provided a method of interpolating a first set of discrete sample values to generate a second set of discrete sample values using an interpolation kernel, characterised in that said interpolation kernel are selected depending on an edge strength indicator, an edge direction indicator and an edge context indicator for each discrete sample value of said first set.

According to still another aspect of the present invention there is provided a method of interpolating image data, said method comprising the steps of:

accessing a first set of discrete sample values of said image data;

calculating kernel values for each of said discrete sample values using one of a plurality of kernels depending upon an edge orientation indicator, an edge strength indicator, and an edge context indicator for each of said discrete sample values; and convolving said kernel values with said discrete sample values to provide a second set of discrete sample values.

According to still another aspect of the present invention there is provided an apparatus for interpolating image data, said apparatus comprising:

means for accessing a first set of discrete sample values of said image data;

calculator means for calculating kernel values for each of said discrete sample values using one of a plurality of kernels depending upon an edge orientation indicator, an edge strength indicator, and an edge context indicator for each of said discrete sample values; and convolution means for convolving said kernel values with said discrete sample values to provide a second set of discrete sample values.

According to still another aspect of the present invention there is provided a computer readable medium for storing a program for an apparatus which processes data, said processing comprising a method of interpolating image data, said program comprising:

code for accessing a first set of discrete sample values of said image data;

code for calculating kernel values for each of said discrete sample values using one of a plurality of kernels depending upon an edge orientation indicator, an edge strength indicator, and an edge context indicator for each of said discrete sample values; and code for convolving said kernel values with said discrete sample values to provide a second set of discrete sample values.

According to still another aspect of the present invention there is provided a method of interpolating image data comprising a first mapping of discrete sample values, said method comprising the steps of:

(i) identifying text regions within said first mapping and labelling each discrete sample value within each text region;

(ii) calculating edge information for each of said discrete sample values of said image data to identify edge sample values and storing an angle of orientation for each of said edge sample values;

(iii) combining said labels and said angle of orientation for each of said discrete sample values to form a second mapping of said discrete sample values;

(iv) manipulating said angle of orientation for each edge sample value within said second mapping to form a third mapping of said discrete sample values;

(v) manipulating said image data of said third mapping to form a fourth mapping of said image data; and (vi) interpolating each sample value of said fourth mapping with a first one of a plurality of kernels depending on said labels and said angle of orientation of each of said sample values of said fourth mapping to form a fifth mapping of said image data.

According to still another aspect of the present invention there is provided an apparatus for interpolating image data comprising a first mapping of discrete sample values, said apparatus comprising:

means for identifying text regions within said first mapping and labelling each discrete sample value within each text region;

first calculating means for calculating edge information for each of said discrete sample values of said image data to identify edge sample values and storing an angle of orientation for each of said edge sample values;

combining means for combining said labels and said angle of orientation for each of said discrete sample values to form a second mapping of said discrete sample values;

manipulating means for manipulating said angle of orientation for each edge sample value within said second mapping to form a third mapping of said discrete sample values, and manipulating said image data of said third mapping to form a fourth mapping of said image data; and interpolation means for interpolating each sample value of said fourth mapping with a first one of a plurality of kernels depending on said labels and said angle of orientation of each of said sample values of said fourth mapping to form a fifth mapping of said image data.

According to still another aspect of the present invention there is provided a computer readable medium for storing a program for an apparatus which processes data, said processing comprising a method of interpolating image data comprising a first mapping of discrete sample values, said program comprising:

code for identifying text regions within said first mapping and labelling each discrete sample value within each text region;

code for calculating edge information for each of said discrete sample values of said image data to identify edge sample values and storing an angle of orientation for each of said edge sample values;

code for combining said labels and said angle of orientation for each of said discrete sample values to form a second mapping of said discrete sample values;

code for manipulating said angle of orientation for each edge sample value within said second mapping to form a third mapping of said discrete sample values;

code for manipulating said image data of said third mapping to form a fourth mapping of said image data; and code for interpolating each sample value of said fourth mapping with a first one of a plurality of kernels depending on said labels and said angle of orientation of each of said sample values of said fourth mapping to form a fifth mapping of said image data.

BRIEF DESCRIPTION OF DRAWINGS

FIG. 7(*a*) shows an original image at a certain resolution;

FIG. 7(*b*) shows the image of FIG. 7(*a*) at a higher resolution after being interpolated using the conventional cubic kernel;

FIG. 7(*c*) shows the image of FIG. 7(*a*) at a higher resolution after being interpolated in accordance with the first embodiment of the present invention;

FIG. 8(*a*) shows an original text image;

FIG. 8(*b*) shows the text image of FIG. 8(*a*) after being interpolated in accordance with the embodiment of the present invention;

FIG. 9(*a*) shows a graphic image that has been interpolated using the conventional NN kernel;

FIG. 9(*b*) shows the graphic image at FIG. 9(*a*) after being interpolated in accordance with the first embodiment of the present embodiment.

DETAILED DESCRIPTION

When re-sampling a digital image, smooth regions and edge regions need to be re-sampled differently. A long symmetrical kernel, such as the conventional Catmull-Rom cubic with parameter c=0.5, is ideal for smooth image regions. A short kernel, such as the Catmull-Rom cubic with c=0, is generally good for edge, corner, or highly textured regions. However, in order to reduce the jaggy effect on oblique edges, edge direction also needs to be taken into account in the interpolation process. Edge direction is important so that the interpolation can smooth along an edge, but not across an edge. In this way, the edge contour is kept smooth, whilst the edge transition is kept sharp.

The first embodiment of the present invention discloses a method of image interpolation that automatically selects the appropriate interpolation kernel for each image region. This selection is based not only on edge strength, but also edge direction and local edge context information. In addition, high contrast text regions are also detected and interpolated so as to preserve the shape and contrast of the text.

The second embodiment of the present invention adjusts the parameters of a single interpolation kernel so as to reshape the kernel to the appropriate shape for each region in the image.

The proposed resolution conversion method first identifies high contrast text regions and then measures both edge strength and edge orientation of the image data. In the first embodiment, the text and edge information is then used to select the appropriate interpolation kernel to use. In the second embodiment, the edge strength and the edge orientation data is used to adjust the parameters of an interpolation kernel. Context information, from the text and edge maps, is then used to remove unnecessary kernel changes and prevent selection of an inappropriate kernel. This post-processing on the raw edge information is required to reduce and remove any interpolation artifacts.

Figure 1:
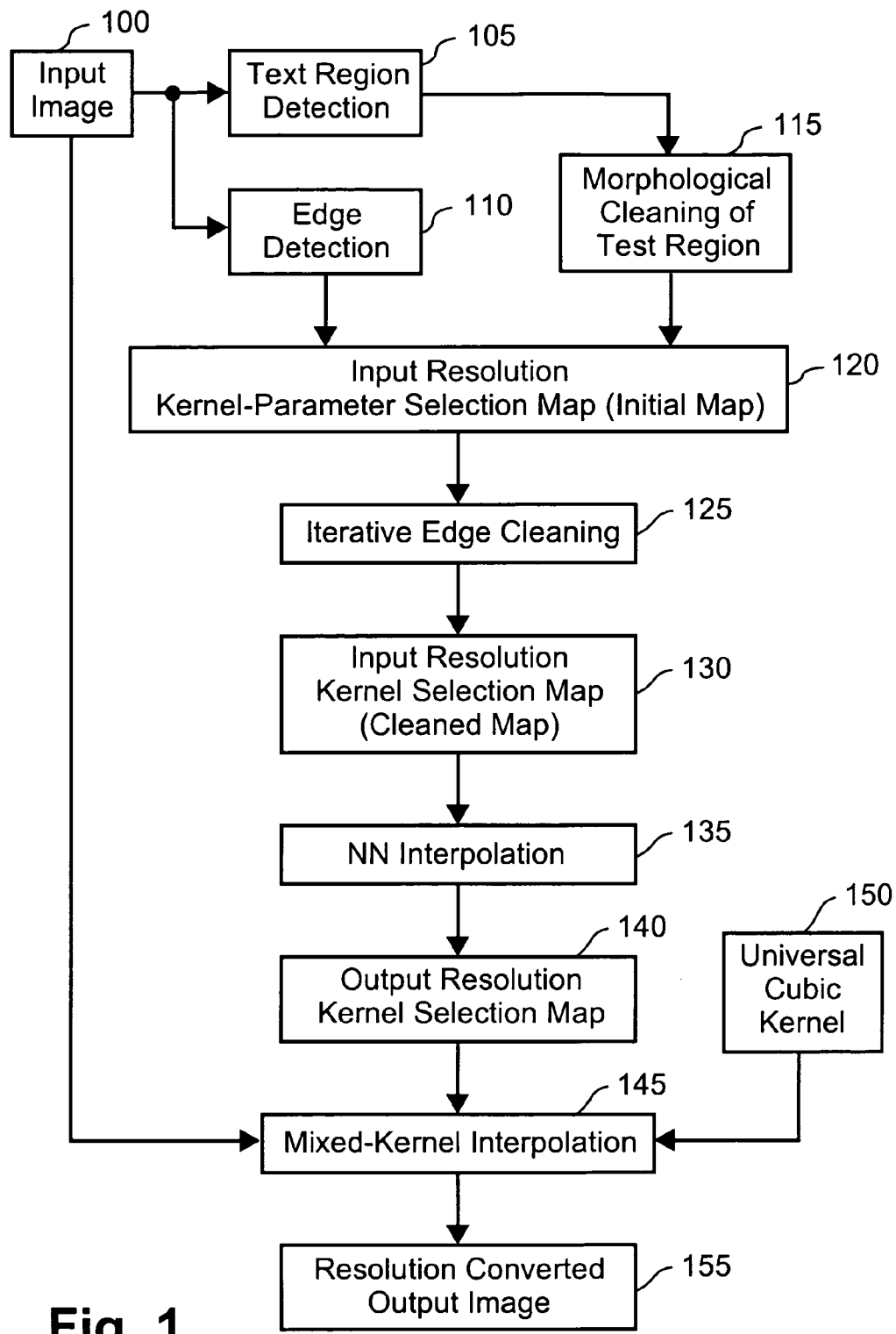
FIG. 1 is a flowchart showing a method of interpolation in accordance with a first embodiment of the present invention.

The disclosed interpolation method according to the preferred embodiment will be briefly explained with reference to FIG. 1. The method comprises of a series of steps which will be explained in more detail later in this document. The process begins at step 100 where image data is accessed. The process continues at step 105, where high contrast text regions are detected. At step 110, both edge strength and edge orientation of the image data are measured. The detected text regions contain cases of isolated pixels, or pixel groups, which are labelled as text. To reduce the chances of unnecessary interpolation kernel switching, these cases need to be removed. This is done, in the preferred embodiment, at the next step 115 using a morphological opening operation which is known in the image processing prior art, on the binary text map. The process continues at the next step 120, where the detected text regions and edge regions are combined into a kernel, or kernel-parameter, selection map for each input pixel. At the next step 125, the kernel, or kernel-parameter, selection map is cleaned. This involves re-orientating edge regions to an underlying uniformly directed edge region or smooth background to produce a cleaned kernel selection map at step 130. The cleaned kernel selection map is at the input pixel resolution. The process continues at the next step 135, where the cleaned kernel selection map is interpolated using the NN interpolation kernel. The result of the NN interpolation is to produce the kernel, or kernel-parameter, selection map for each output pixel, at step 140. At the next step 145, the appropriate interpolation kernel, based on the output-resolution kernel selection map, is applied to the image data. The interpolation kernel applied to the image data, at step 145, can be a Universal Cubic Kernel 150 in accordance with the preferred embodiment, which will be disclosed later in this document. The process concludes at step 155, where the resolution converted output image is preferably displayed or further processed by a graphics processor or the like.

The above steps do not have to operate on the complete image at any one time. However, for simplicity the preferred embodiment will be described in terms of processing the complete image of input pixels. It is desirable, although not mandatory, that the algorithm according to the preferred embodiment operate in a memory-localised manner so that only a limited number of lines (preferably 5 lines in the raster scan direction) of the input image are required at any one time. Alternatively, the algorithm can be applied to arbitrary image sub-regions, or blocks.

The following description of the preferred embodiment is described in terms of colour images represented in a Red, Green, Blue (RGB) colour space. With suitable modifications the technique can easily be applied to grey level images (only one colour plane) or any arbitrary colour space representation (such as YUV, or YCbCr). Alternatively, if images are presented in another colour space they can first be transformed to an RGB colour space before being processed.

The above steps of the present invention will now be explained in more detail with reference to FIGS. 1 to 6.

Text Detection and Text Map Cleaning Step:

The text detection and text map cleaning is explained with reference to FIG. 2. The local contrast between neighbouring pixels is used as the basis of text region detection. Text regions are usually regions where the local contrast is high, the number of colours is limited, and the texture is simple. These criteria allow the detection of multilingual text information rendered in a high contrast fashion.

The process begins at step 200, where the text map is initialised to smooth. At the next step 205, the following steps 215 to 230 are carried out for each colour plane and for each pixel in the image. Each pixel and colour plane of the input image is scanned with a 3 by 3 neighbourhood operator. At step 215, for each centre pixel, P0, the value C is compared with a threshold, Ttxt, where C is given as follows:

$$C = \max(|Po - P_i|), i \in 1, \ldots, 8 \quad (3)$$

and where i is the index of the 8 nearest neighbour pixels of the centre pixel P0. In the preferred embodiment a value of Ttxt=220 is used. At the next step 220, the value of C is compared with the threshold, Ttxt. If the value of C is over the threshold, Ttxt, the pixel P0 is labelled as text region at step 225.

The detected text regions contain cases of isolated pixels, or pixel groups, which are labelled as text. To reduce the chances of unnecessary interpolation kernel switching, these cases need to be removed. This is done, in the preferred embodiment, at the next step 230 using a morphological opening operation which is known in the image processing prior art, on the binary text map. A structuring element defined by matrix S is used to clean the text detection map as follows:

$$S = \begin{bmatrix} 1 & 1 \\ 1 & 1 \end{bmatrix}$$

The morphological opening operation, which is defined as an erosion followed by a dilation with S, removes the following patterns (including their rotated versions):

$$\begin{bmatrix} 1 & 0 \\ 0 & 0 \end{bmatrix}, \begin{bmatrix} 1 & 0 \\ 1 & 0 \end{bmatrix}, \begin{bmatrix} 0 & 1 \\ 1 & 0 \end{bmatrix}, \begin{bmatrix} 1 & 1 \\ 1 & 0 \end{bmatrix}$$

The text detection and text map cleaning process concludes after steps 215 to 230 have been carried out for each pixel in the image.

Edge Strength and Direction Detection Step:

The edge strength and direction detection step will be explained with reference to FIG. 3. The process begins at step 300, where the edge map is initialised to smooth. At the next step 305, the following steps 315 to 335 are carried out for each colour plane and for each pixel in the image. At step 315, horizontal and vertical edge responses, which we shall refer to as Gh and Gv respectively, are calculated for each input image pixel. In the preferred embodiment this is done utilising a 5-tap optimal edge detector which is known in the art. The coefficients used for forming Gh and Gv are shown in Table 1.

| Low-pass  | 0.036420  | 0.248972  | 0.429217 | 0.248972 | 0.036420 |
| --------- | --------- | --------- | -------- | -------- | -------- |
| High-pass | −0.108415 | −0.280353 | 0        | 0.280353 | 0.108415 |

Table 1. Edge Detection coefficients used in the preferred embodiment. Shown are the low-pass (interpolating) and high-pass (first derivative) kernels.

At the next step 320, the gradient magnitude, Gm, is obtained from the strengths of these two components using:

$$G_m = \sqrt{G_v^2 + G_h^2} \quad (5)$$

The maximum gradient value in the R, G, and B colour components is used to determine the overall edge gradient strength. The process continues at the next step 320 where the gradient magnitude, Gm, is compared with a threshold Gth. If it is less than the threshold, the pixel is classified as a non-edge pixel. Otherwise the pixel is classified to be an edge pixel and the edge direction Gθ recorded in the EdgeMap, at step 330. Therefore, the colour plane with the maximum gradient strength is used to estimate the edge direction for each input pixel. The edge gradient direction, Gθ, is estimated using:

$$G_\theta = \tan^{-1} \frac{G_v}{G_h} \quad (4)$$

The process continues at step 335, where the edge pixel direction is quantised into one of the four cases: horizontal (0), vertical (π/2), diagonal (π/4), and anti-diagonal (3π/4).

The edge strength and direction detection process concludes after steps 315 to 335 have been carried out for each pixel in the image.

It is noted that by increasing the number of quantisation bins and interpolating with the correspondingly oriented steerable kernels, better interpolation output can be produced. However, this also increases the complexity of the implementation and so quantisation into 4 directions is used in the preferred embodiment.

Figure 4:
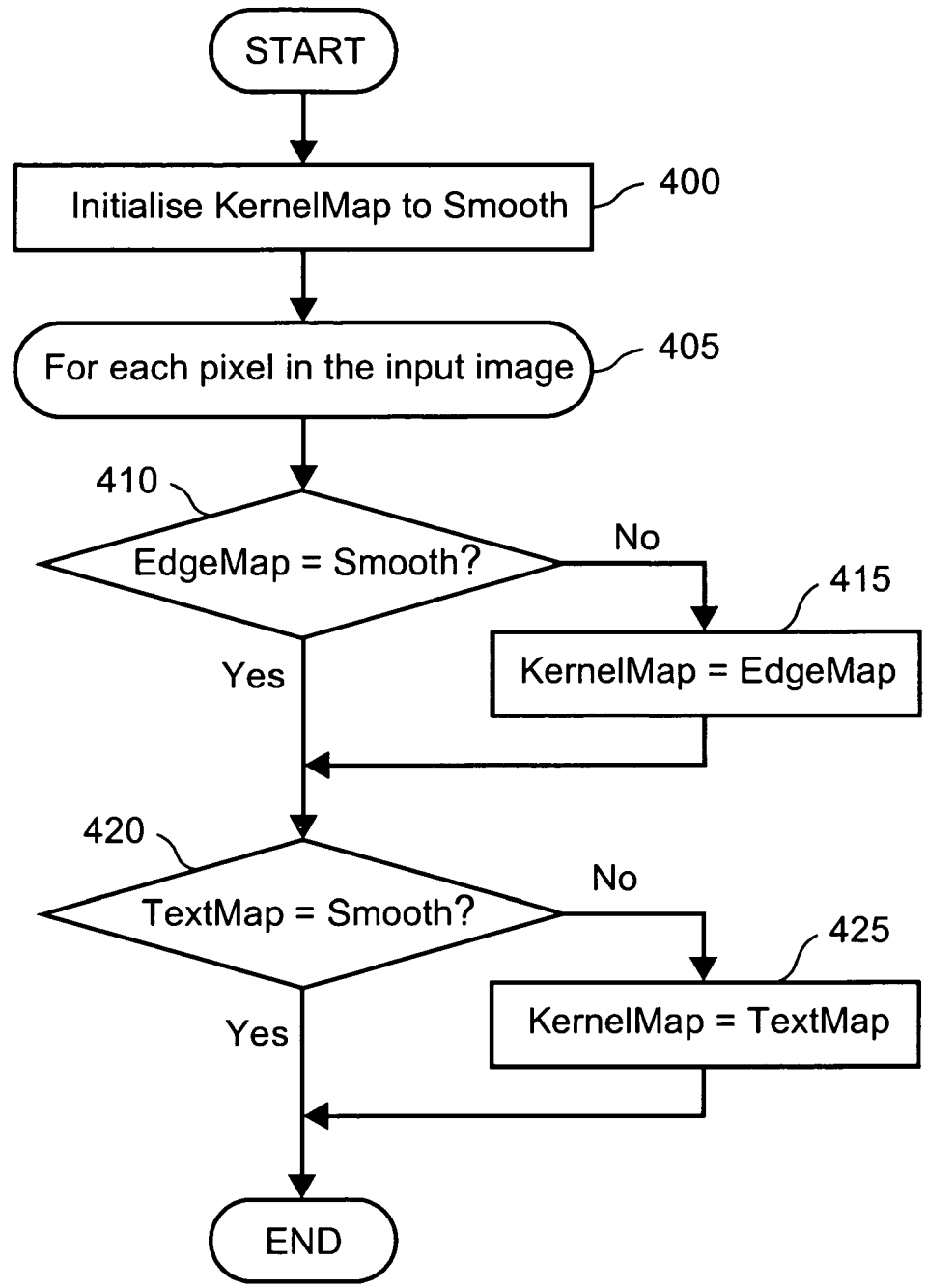
FIG. 4 is a flowchart showing a method of combining the text map and the edge map in accordance with the method of interpolation of FIG. 1.

Combination of the Text and Edge Information into the Kernel Selection Map:

The combination of the text and edge information into the kernel selection map will now be explained with reference to FIG. 4. It is assumed that the input image is smooth with the exception of the pixels where edge or text regions have been detected. The kernel selection map is therefore initialised, at step 400, to select a generic smoothing kernel. In the preferred embodiment a cubic interpolation kernel with parameter c=0.5 is used for interpolating pixels in these smooth regions. The process continues at step 405, where steps 410 to 425 are carried out for each pixel in the input image where the text region and edge region (edge direction) information is then superimposed onto the kernel selection map. Where both text region and edge region are present, the text region information takes precedence. The precedence of the text region over edge region is an important one since there are lots of edge activities in text regions and counting them as directional edges can cause excessive kernel switching and therefore visual artefacts. The process continues at step 410 where a check is carried out to see if the current pixel in the EdgeMap is classified as smooth. If the current pixel in the EdgeMap is not smooth, the EdgeMap information is recorded in the KernelMap, at step 415. At the next step 420, a check is carried out to see if the current pixel in the TextMap is classified as smooth. If the current pixel in the TextMap is not smooth, the TextMap information is recorded in the KernelMap, at step 425. The combination of the text and edge information into the kernel selection map process concludes after steps 410 to 425 have been carried out for each pixel in the input image.

Figure 5:
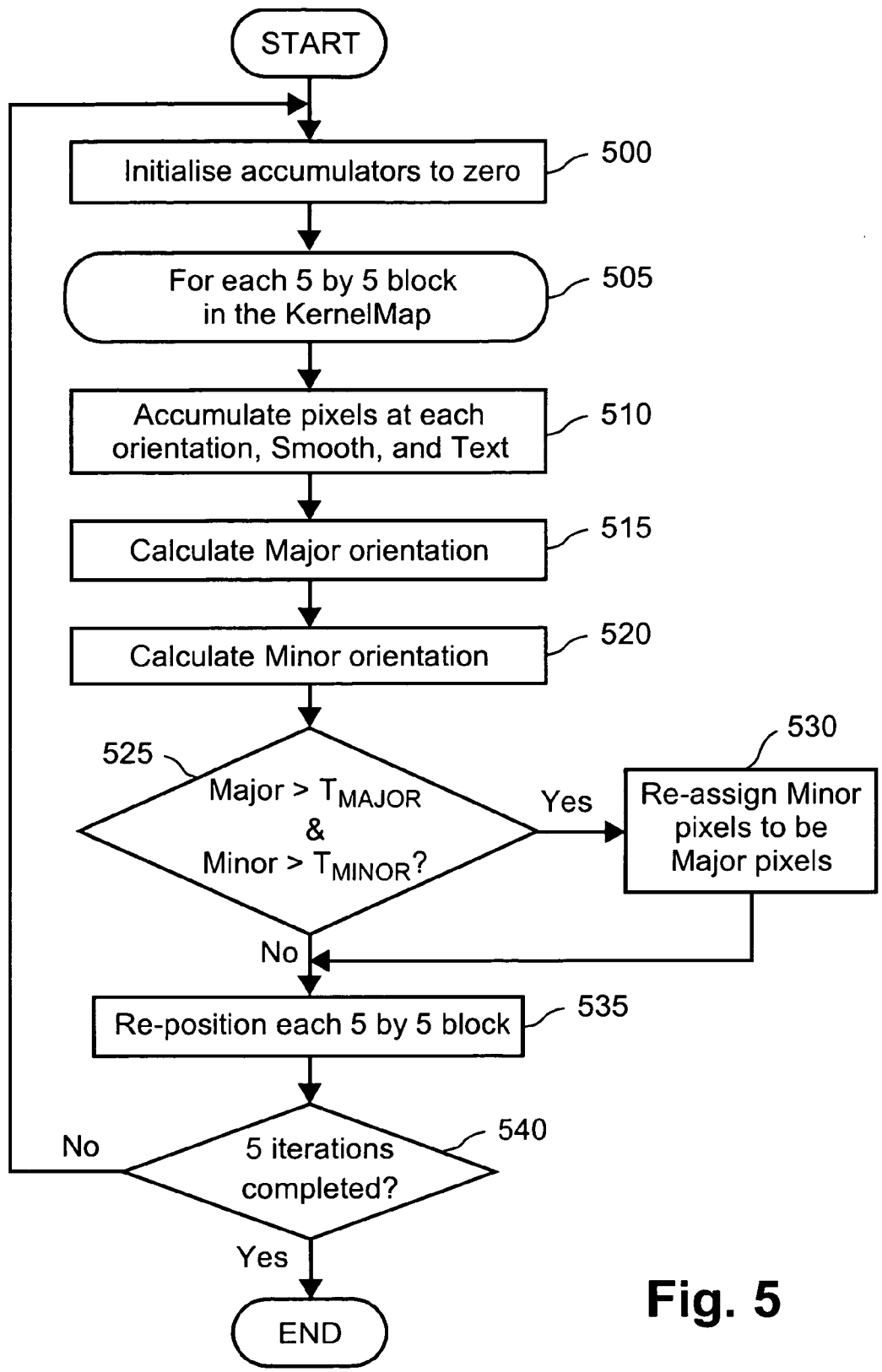
FIG. 5 is a flowchart showing a method of cleaning the kernel selection map in accordance with the method of interpolation of FIG. 1.

Cleaning of the Kernel Selection Map:

The cleaning of the kernel selection map process is explained with reference to FIG. 5. There are cases of isolated edge directions occurring in an otherwise uniformly directed local region. These sparsely distributed edge regions are best re-oriented to the underlying uniformly directed edge region or smooth background. This again is to avoid excessive kernel switching which may result in visual artifacts in the interpolated image.

The process begins at step 500 where the accumulators are initialised. At the next step 505, the steps 510 to 540 are carried out for each 5 by 5 block in the KernelMap. At step 510, in a 5×5 neighbourhood, the number of edge pixels of each edge orientation (including text and background) are accumulated. The process continues at step 515 where the major edge orientations are identified. At the next step 520, the minor edge orientations are identified. The major and minor edge orientations are identified and minor edge pixels are reassigned to the major orientation in the following steps, with the exception of identified text region pixels. At the next step 525, the calculated major edge orientation is compared with Tmajor and the calculated minor edge orientation is compared with Tminor. At step 530, an orientation is set to be the major orientation if there are more than Tmajor pixels in the 5 by 5 region and an orientation is set to be a minor orientation if there are less than Tminor pixels in the 5 by 5 region. In the preferred embodiment the major threshold, Tmajor, is 15 and the minor threshold, Tminor, is 5. The total number of pixels in the 5 by 5 region is 25. If the accumulated edge pixels are above the major threshold, a major edge direction is found. Otherwise, the pixel region remains unchanged. The major or minor orientations can also be background or text regions. At the next step 535, the 5 by 5 pixel block shifts one column along the image buffer and the process repeats for the next adjacent 5 by 5 pixel block. These blocks do not overlap each other in any single pass of the image. The process iterates a fixed number of times, and a check is carried out at step 540 to see if 5 iterations have been completed at which point the process will conclude. In the preferred embodiment, 5 iterations are sufficient to clean the map to a reasonable degree, however 5 iterations are not mandatory.

Figure 6:
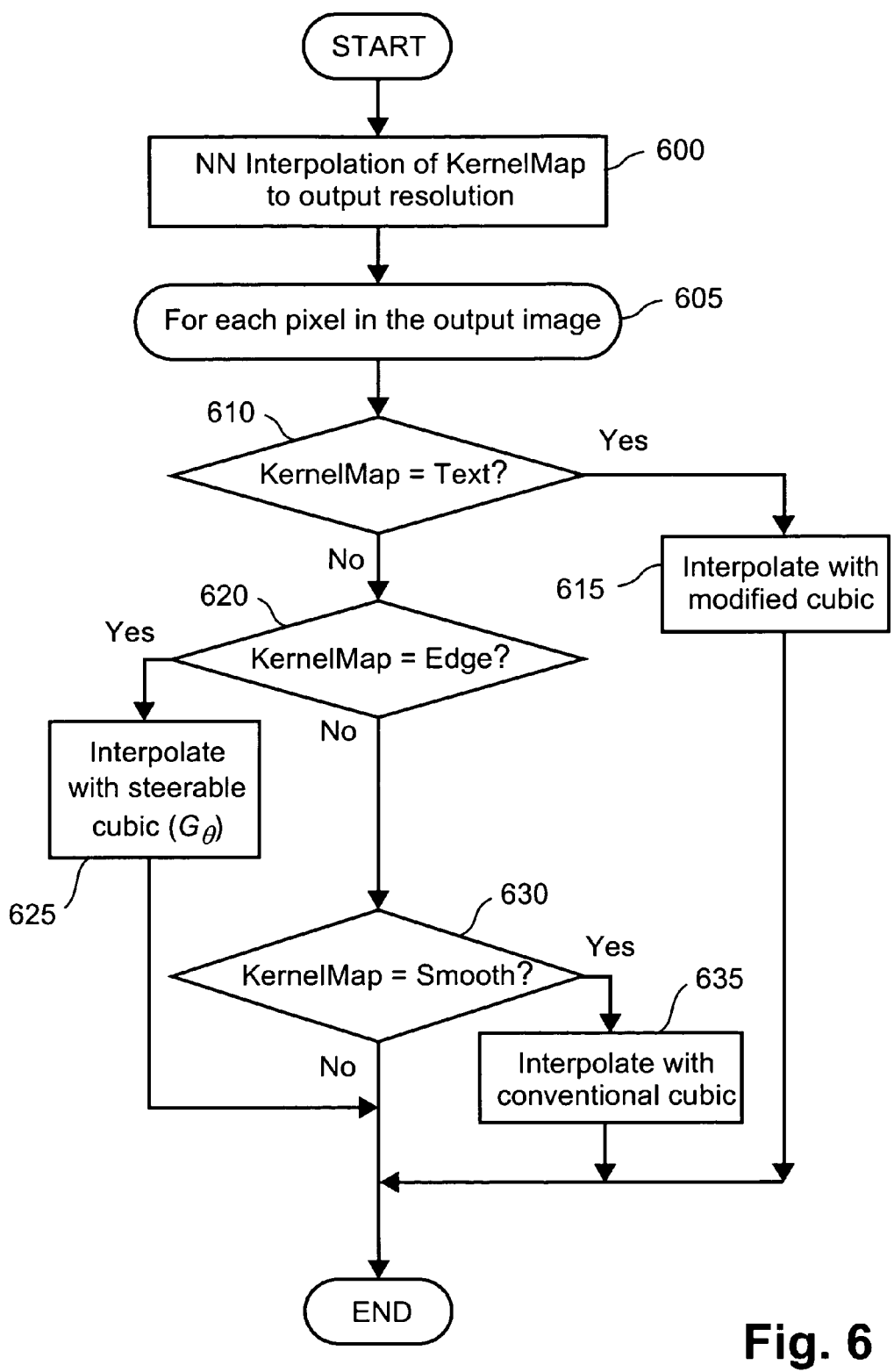
FIG. 6 is a flowchart showing a method of interpolating an output image in accordance with the method of interpolation of FIG. 1.

Apply Interpolation to Cleaned Kernel Selection Map:

The step of applying interpolation to the cleaned kernel selection map will now be explained with reference to FIG. 6. The process begins at step 600, where the kernel selection map (KernelMap) is interpolated to be the same size as the output image. The nearest neighbour (NN) interpolation method is used to obtain the kernel selection map at the required output resolution. NN interpolation is used to reduce the computation cost associated with more complex interpolation methods (such as linear and cubic) without significantly reducing the output image quality. Alternatively, the NN interpolation is not actually carried out, but the kernel is selected in the O/P image dependent on the nearest pixel in the KernelMap.

After the kernel selection map (KernelMap) has been interpolated to be the same size as the output image, each entry is read so that the correct interpolation kernel can be used. At the next step 610, a check is carried out to see if the KernelMap information is classified as text. If KernelMap=Text then the text pixel is interpolated with a modified cubic kernel, at step 615. The modified cubic kernel of the preferred embodiment, h(s), is given by:

$$h(s) = \begin{cases} 1, & -d < s \le d \\ 0, & (1-d) \ge s > (1-d) \\ 2\left|\frac{s-d}{1-2d}\right|^3 - 3\left|\frac{s-d}{1-2d}\right|^2 + 1, & \end{cases} \quad (5)$$

where $s=t/\Delta t$ is a normalised coordinate that has integer values at the sample points.

In the preferred embodiment parameter, d, is set to 0.2. Note this kernel has a reduced size of 2-by-2.

The process continues at step 620, if the KernelMap is not classified as text, where a check is carried out to see if the KernelMap information is classified as an edge. If KernelMap=Edge, then the edge pixels are interpolated with one of the four steerable cubic kernels at step 625. The steerable kernels of the preferred embodiment, where $h(s_x, s_y)$, are given by:

$$h(s_x, s_y)_{\theta=0} = \frac{1}{\sqrt{2}}\{h(s_x)_{c=0.5} \cdot h(s_y)_{c=0}\} \quad (6)$$

$$h(s_x, s_y)_{\theta=\pi/2} = \frac{1}{\sqrt{2}}\{h(s_x)_{c=0} \cdot h(s_y)_{c=0}\} \quad (7)$$

$$h(s_x, s_y)_{\theta=\pi/4} = \frac{1}{\sqrt{2}}\left\{h\left(\frac{s_x+s_y}{2}\right)_{c=0.5} \cdot h\left(\frac{s_x-s_y}{\sqrt{2}}\right)_{c=0}\right\} \quad (8)$$

$$h(s_x, s_y)_{\theta=3\pi/4} = \frac{1}{\sqrt{2}}\left\{h\left(\frac{s_x+s_y}{\sqrt{2}}\right)_{c=0} \cdot h\left(\frac{s_x-s_y}{2}\right)_{c=0.5}\right\} \quad (9)$$

where $s_x=x/\Delta x$ and $s_y=y/\Delta y$ are re-sampling distances in the horizontal and vertical directions, respectively, and · indicates matrix multiplication. The quantised edge orientations define the required orientation of the steerable cubic kernel, ie., either 0, π/4, π/2, or 3π/4.

The process continues at step 630 where, if the KernelMap is not classified as an edge, a check is carried out to see if the KernelMap information is smooth. If KernelMap=Smooth, then the pixels are interpolated with the conventional Catmull-Rom cubic kernel (b=0, c=0.5).

FIGS. 7 to 9 illustrate the interpolation efficacy of the present invention on a number of typical images. FIG. 7(*a*) shows an original image at a certain resolution before interpolation has taken place. FIG. 7(*b*) shows the image of FIG. 7(*a*) at a higher resolution after being interpolated using the conventional cubic kernel. In contrast, FIG. 7(*c*) shows the image of FIG. 7(*a*) at a higher resolution after being interpolated in accordance with the preferred embodiment of the present invention. It can be seen that FIG. 7(*c*) shows an image with sharper edges and less blurring than FIG. 7(*b*).

FIG. 8(*b*) shows the text image of FIG. 8(*a*) that has been enlarged to 2.7 times in both directions using the interpolation method in accordance with the preferred embodiment of the present invention.

FIG. 9(a) shows a graphic image that has been interpolated using a conventional NN kernel. FIG. 9(b) shows the same graphic image that has been interpolated using the interpolation method in accordance with the preferred embodiment of the present invention. It can be seen from the image in FIG. 9(b) that the oblique lines are smoothed along their directions compared to the image of FIG. 9(a).

In the second embodiment of the present invention the KernelMap does not contain an encoding for the different kernels that can be used in the interpolation, but rather parameter values to be applied to one "universal" kernel. The definition of the universal cubic interpolation kernel, being a combination of the conventional kernel of equation (1), the modified kernel of equation (5), and fully steerable cubic kernels of equations (6), (7), (8) and (9), is as follows:

$$h(s_x, s_y)_{0 \le \theta \le \pi/2} = \frac{1}{\sqrt{2}} \{ h((1 - 2\theta/\pi)s_x + (2\theta/\pi)s_y)_{c=0.5} \cdot h(((2\theta/\pi)s_x + (2\theta/\pi - 1)s_y)w(\theta))_{c=0} \} \quad (10)$$

$$h(s_x, s_y)_{\pi/2 < \theta < \pi} = \frac{1}{\sqrt{2}} \{ h((2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0} \}, \quad (11)$$

Where the across edge weighting factor, w(θ), is a smooth function constrained to pass through 1 when θ=0, π/2, and π and through √2 when θ=π/4 and 3π/4. The function used in the preferred embodiment is as follows:

$$w(\theta) = 1 + \frac{\sqrt{2} - 1}{2} - \left( \frac{\sqrt{2} - 1}{2} \cos(4\theta) \right) \quad (12)$$

And the universal interpolation kernel, h(s), is given by:

$$h(s) = \begin{cases} 1, & 0 \le |s| \le d \\ \left(2 - \frac{3}{2}b - c\right)\left|\frac{s-d}{1-2d}\right|^3 + (-3 + 2b + c)\left|\frac{s-d}{1-2d}\right|^2 + \left(1 - \frac{1}{3}b\right), & d < |s| \le 1 - d \\ 0, & 1 - d < |s| \le 1 + d \\ \left(-\frac{1}{6}b - c\right)\left|\frac{s-3d}{1-2d}\right|^3 + (b + 5c)\left|\frac{s-3d}{1-2d}\right|^2 + (-2b - 8c)\left|\frac{s-3d}{1-2d}\right| + \left(\frac{4}{3}b + 4c\right), & 1 + d < |s| \le 2 - d \\ 0, & \text{Otherwise} \end{cases} \quad (13)$$

where d is the parameter controlling the width of a "dead zone" of the cubic interpolation kernel.

Based on the kernel-parameter map, the input image regions are interpolated with the universal cubic kernel with parameters set as follows:

Text regions are interpolated with the edge orientation angle parameter, θ=0, the "dead zone" parameter, d=0.2, and cubic parameters b=0 and c=0. This gives a reduced kernel size of 2-by-2, ie., the remaining kernel coefficients are all zero.

Edge regions are interpolated with θ set to either 0, π/4, π/2, or 3π/4 (dependent on the edge angle, Gθ), d=0, b=0, and c=0.5. This is a 4 by 4 kernel, though either 6 or 8 of these coefficients will be zero, depending on the orientation angle (θ).

Smooth regions are interpolated with θ=0, d=0, b=0, and c=0.5. This is a 4 by 4 non-zero kernel.

PREFERRED EMBODIMENT OF APPARATUS(S)

Figure 10:
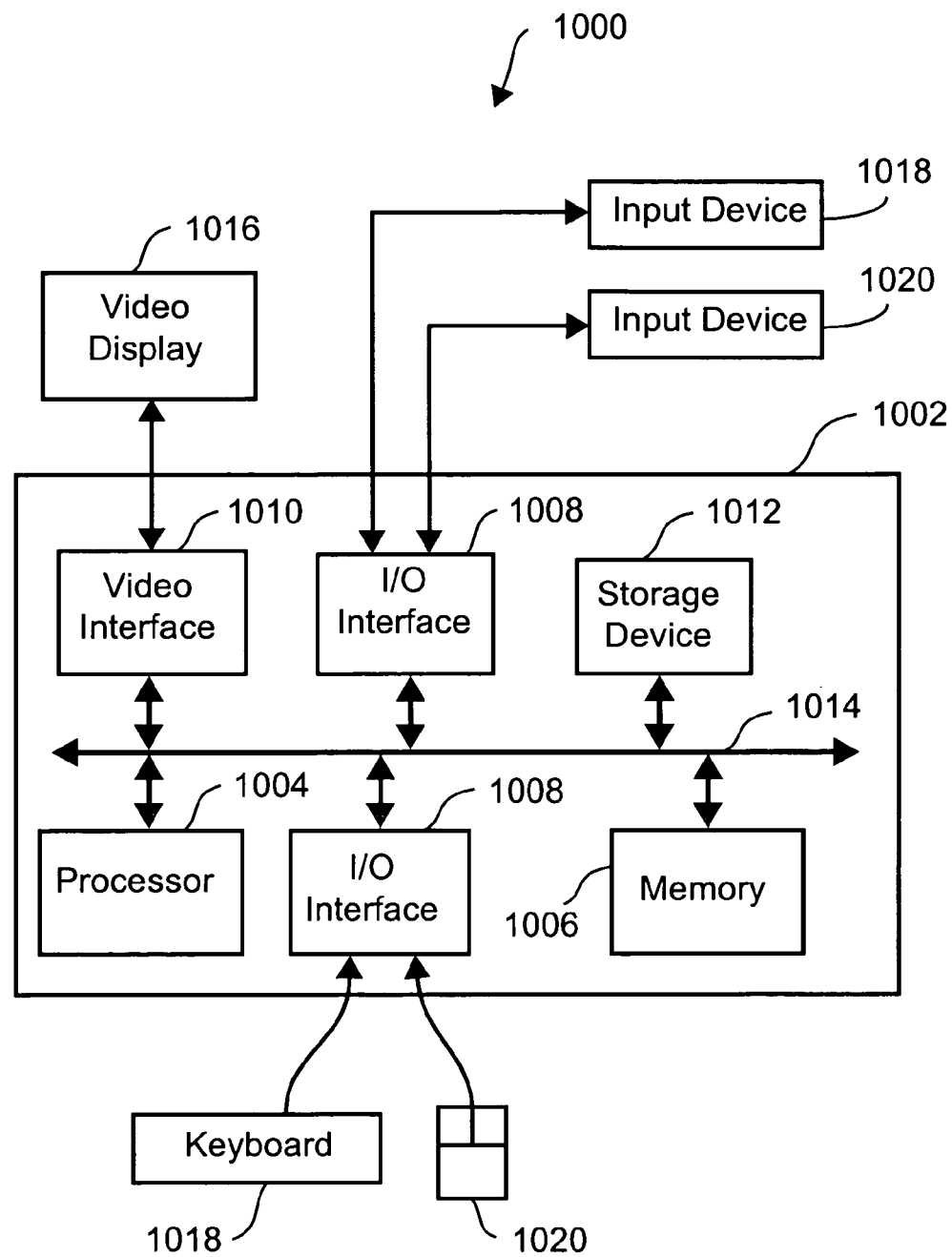
FIG. 10 is a block diagram of a general purpose computer with which the embodiments can be implemented.

The preferred method is preferably practiced using a conventional general-purpose computer system, such as the system 1000 shown in FIG. 10, wherein the process of FIGS. 1 to 6 can be implemented as software executing on the computer. In particular, the steps of the method are effected by instructions in the software that are carried out by the computer. The software can be divided into two separate parts; one part for carrying out the method of the preferred embodiment; and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for orientating a character stroke or n-dimensional finite space curves in accordance with the embodiments of the invention.

The computer system 1000 has a computer module 1002, a video display 1016, and input devices 1018, 1020. In addition, the computer system 1000 can have any of a number of other output devices including line printers, laser printers, plotters, and other reproduction devices connected to the computer module 1002. The computer system 1000 can be connected to one or more other computers via a communication interface 1008c using an appropriate communication channel 1030 such as a modem communications path, a computer network, or the like. The computer network can include a local area network (LAN), a wide area network (WAN), an Intranet, and/or the Internet.

The computer module 1002 has a central processing unit(s) (simply referred to as a processor hereinafter) 1004, a memory 1006 which can include random access memory (RAM) and read-only memory (ROM), input/output (IO) interfaces 1008, a video interface 1010, and one or more storage devices generally represented by a block 1012 in FIG. 10. The storage device(s) 1012 can include one or more of the following: a floppy disc, a hard disc drive, a magneto-optical disc drive, CD-ROM, magnetic tape or any other of a number of non-volatile storage devices well known to those skilled in the art. Each of the components 1004 to 1012 is typically connected to one or more of the other devices via a bus 1014 that in turn has data, address, and control buses.

The video interface 1010 is connected to the video display 1016 and provides video signals from the computer 1002 for display on the video display 1016. User input to operate the computer 1002 can be provided by one or more input devices 1008. For example, an operator can use the keyboard 1018 and/or a pointing device such as the mouse 1020 to provide input to the computer 1002.

The computer system 1000 is simply provided for illustrative purposes and other configurations can be employed without departing from the scope and spirit of the invention. Exemplary computers on which the embodiment can be practiced include the IBM-PC/ATs or compatibles, one of the Macintosh (TM) family of PCs, Sun Sparcstation (TM), arrangements evolved therefrom. The foregoing are merely exemplary of the types of computers with which the embodiments of the invention can be practiced. Typically, the processes of the embodiments, described hereinafter, are resident as software or a program recorded on a hard disk drive (generally depicted as block 1012 in FIG. 10) as the computer readable medium, and read and controlled using the processor 1004. Intermediate storage of the program and pixel data and any data fetched from the network can be accomplished using the semiconductor memory 1006, possibly in concert with the hard disk drive 1012.

In some instances, the program can be supplied to the user encoded on a CD-ROM or a floppy disk (both generally depicted by block 1012), or alternatively could be read by the user from the network via a modem device connected to the computer, for example. Still further, the software can also be loaded into the computer system 1000 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums can be practiced without departing from the scope and spirit of the invention.

The preferred method of reconstructing a continuous signal can alternatively be implemented in dedicated hardware such as one or more integrated circuits performing the functions or sub functions of the steps of the method. Such dedicated hardware can include graphic processors, digital signal processors, or one or more microprocessors and associated memories.

The foregoing only describes two embodiments of the present invention, however, modifications and/or changes can be made thereto by a person skilled in the art without departing from the scope and spirit of the invention.

What is claimed is:

1. A method of interpolating a first set of discrete sample values to generate a second set of discrete sample values using one of a plurality of interpolation kernels, said method comprising the steps of:
    identifying text regions in the first set of discrete sample values depending on a local contrast indicator for each of the discrete sample values of the first set;
    identifying edge regions in the first set of discrete sample values depending on an edge strength indicator and an edge direction indicator for each of the discrete sample values of the first set;
    combining the text regions and the edge regions to form a kernel selection map;
    cleaning the kernel selection map by re-assigning orientations of any edge regions having isolated edge directions occurring in an otherwise uniformly directed local region of the first set of discrete sample values, according to the uniform direction; and
    selecting the interpolation kernel using the cleaned kernel selection map for use in interpolating the first set of discrete sample values to generate the second set of discrete sample values.

2. The method according to claim 1, wherein the plurality of interpolation kernels are each derived from a universal interpolation kernel, h(s).

3. The method according to claim 1, wherein the plurality of kernels are given by:

$$h(s_x, s_y)_{0 \leq \theta \leq \pi/2} = \frac{1}{\sqrt{2}}$$
$$\{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot$$
$$h(((2\theta/\pi - 2)s_x + (1 - 2\theta/\pi)s_y)w(\theta))_{c=0}\},$$

and wherein h(s) is a universal interpolation kernel, $s_x = x/\Delta x$ and $s_y = y/\Delta y$ are re-sampling distances in the horizontal and vertical directions, respectively, and · indicates matrix multiplication.

4. The method according to claim 1,wherein the plurality of kernels are given by:

$$h(s) = \begin{cases} \left(2 - \frac{3}{2}b - c\right)|s|^3 + (-3 + 2b + c)|s|^2 + \left(1 - \frac{1}{3}b\right), & |s| \leq 1 \\ \left(-\frac{1}{6}b - c\right)|s|^3 + (b + 5c)|s|^2 + (-2b - 8c)|s| + \left(\frac{4}{3}b + 4c\right), & 1 < |s| \leq 2 \\ 0, & \text{Otherwise} \end{cases}$$

$$h(s) = \begin{cases} 1, & -d < |s| \leq d \\ 0, & (1-d) \geq s > (1-d) \\ 2\left|\frac{s-d}{1-2d}\right|^3 - 3\left|\frac{s-d}{1-2d}\right|^2 + 1, \end{cases}$$

$$h(s_x, s_y)_{\theta=0} = \frac{1}{\sqrt{2}} \{h(s_x)_{c=0.5} \cdot h(s_y)_{c=0}\}$$

$$h(s_x, s_y)_{\theta=\pi/2} = \frac{1}{\sqrt{2}} \{h(s_x)_{c=0} \cdot h(s_y)_{c=0.5}\}$$

$$h(s_x, s_y)_{\theta=\pi/4} = \frac{1}{\sqrt{2}} \left\{ h\left(\frac{s_x + s_y}{2}\right)_{c=0.5} \cdot h\left(\frac{s_x - s_y}{\sqrt{2}}\right)_{c=0} \right\}$$

$$h(s_x, s_y)_{\theta=3\pi/4} = \frac{1}{\sqrt{2}} \left\{ h\left(\frac{s_x + s_y}{\sqrt{2}}\right)_{c=0} \cdot h\left(\frac{s_x - s_y}{2}\right)_{c=0.5} \right\},$$

and wherein h(s) is a modified cubic kernel, $s_x = x/\Delta x$ and $s_y = y/\Delta y$ are re-sampling distances in the horizontal and vertical directions, respectively, and · indicates matrix multiplication.

5. The method according to claim 1, wherein the first set of discrete sample values are at a different resolution to the second set of discrete sample values.

6. The method according to claim 1, wherein one or more of the indicators are processed using a morphological process.

7. A method of interpolating image data, said method comprising the steps of:
accessing a first set of discrete sample values of the image data;
identifying text regions in the first set of discrete sample values depending on a local contrast indicator associated with each of the discrete sample values of the first set;
identifying edge regions in the first set of discrete sample values depending on an edge strength indicator and an edge direction indicator for each of the discrete sample values of the first set;
combining the text regions and the edge regions to form a kernel selection map;
cleaning the kernel selection map by re-assigning orientations, of any edge regions having isolated edge directions occurring in an otherwise uniformly directed local region of the first set of discrete sample values, according to the uniform direction;
calculating kernel values for each of the discrete sample values using one of a plurality of kernels, wherein the one kernel is selected from the plurality of kernels using the cleaned kernel selection map; and
convolving the kernel values with the discrete sample values to provide a second set of discrete sample values.

8. The method according to claim 7, wherein the plurality of interpolation kernels are each derived from a universal interpolation kernel, h(s).

9. The method according to claim 7, wherein the plurality of kernels are given by:

$$h(s_x, s_y)_{0 \leq \theta \leq \pi/2} = \frac{1}{\sqrt{2}}$$
$$\{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot$$
$$h(((2\theta/\pi - 2)s_x + (1 - 2\theta/\pi)s_y)w(\theta))_{c=0}\},$$

and wherein h(s) is a universal interpolation kernel, $s_x = x/\Delta x$ and $s_y = y/\Delta y$ are re-sampling distances in the horizontal and vertical directions, respectively, and · indicates matrix multiplication.

10. The method according to claim 7, wherein the plurality of kernels are given by:

$$h(s) = \begin{cases} \left(2 - \frac{3}{2}b - c\right)|s|^3 + (-3 + 2b + c)|s|^2 + \left(1 - \frac{1}{3}b\right), & |s| \leq 1 \\ \left(-\frac{1}{6}b - c\right)|s|^3 + (b + 5c)|s|^2 + (-2b - 8c)|s| + \left(\frac{4}{3}b + 4c\right), & 1 < |s| \leq 2 \\ 0, & \text{Otherwise} \end{cases}$$

-continued $$h(s) = \begin{cases} 1, & -d < |s| \leq d \\ 0, & (1-d) \geq s > (1-d) \\ 2\left|\frac{s-d}{1-2d}\right|^3 - 3\left|\frac{s-d}{1-2d}\right|^2 + 1, & \end{cases}$$

$$h(s_x, s_y)_{\theta=0} = \frac{1}{\sqrt{2}} \{h(s_x)_{c=0.5} \cdot h(s_y)_{c=0}\}$$

$$h(s_x, s_y)_{\theta=\pi/2} = \frac{1}{\sqrt{2}} \{h(s_x)_{c=0} \cdot h(s_y)_{c=0.5}\}$$

$$h(s_x, s_y)_{\theta=\pi/4} = \frac{1}{\sqrt{2}} \left\{ h\left(\frac{s_x + s_y}{2}\right)_{c=0.5} \cdot h\left(\frac{s_x - s_y}{\sqrt{2}}\right)_{c=0} \right\}$$

$$h(s_x, s_y)_{\theta=3\pi/4} = \frac{1}{\sqrt{2}} \left\{ h\left(\frac{s_x + s_y}{\sqrt{2}}\right)_{c=0} \cdot h\left(\frac{s_x - s_y}{2}\right)_{c=0.5} \right\},$$

and wherein h(s) is a modified cubic kernel, $s_x = x/\Delta x$ and $s_y = y/\Delta y$ are re-sampling distances in the horizontal and vertical directions, respectively, and · indicates matrix multiplication.

11. The method according to claim 7, wherein the first set of discrete sample values are at a different resolution to the second set of discrete sample values.

12. An apparatus for interpolating image data, said apparatus comprising:
means for accessing a first set of discrete sample values of the image data;
text identifying means for identifying text regions in the first set of discrete sample values depending on a local contrast indicator associated with each of the discrete sample values of the first set;
edge region identifying means for identifying edge regions in the first set of discrete sample values depending on an edge strength indicator and an edge direction indicator for each of the discrete sample values of the first set;
kernel selection map means for combining said text regions and said edge regions to form a kernel selection map;
cleaning means for cleaning the kernel selection map by re-assigning orientations of any edge regions having isolated edge directions occurring in an otherwise uniformly directed local region of the first set of discrete sample values, according to the uniform direction;
calculator means for calculating kernel values for each of the discrete sample values using one of a plurality of kernels, wherein the one kernel is selected from the plurality of kernels using the cleaned kernel selection map; and
convolution means for convolving the kernel values with the discrete sample values to provide a second set of discrete sample values.

13. The apparatus according to claim 12, wherein the plurality of interpolation kernels are each derived from a universal interpolation kernel, h(s).

14. The apparatus according to claim 12, wherein the plurality of kernels are given by:

$$h(s_x, s_y)_{0 \leq \theta \leq \pi/2} = \frac{1}{\sqrt{2}}$$
$$\{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

-continued $$h(s_x, s_y)_{\pi/2<\theta<\pi} = \frac{1}{\sqrt{2}}\{h((2\theta/\pi - 1)s_x + (2\theta/\pi - 2)s_y)_{c=0.5} \cdot$$
$$h(((2\theta/\pi - 2)s_x + (1 - 2\theta/\pi)s_y)w(\theta))_{c=0}\},$$

and wherein h(s) is a universal interpolation kernel, $s_x = x/\Delta x$ and $s_y = y/\Delta y$ are re-sampling distances in the horizontal and vertical directions, respectively, and · indicates matrix multiplication.

15. The apparatus according to claim 12, wherein the plurality of kernels are given by:

$$h(s) = \begin{cases} \left(2 - \frac{3}{2}b - c\right)|s|^3 + (-3 + 2b + c)|s|^2 + \left(1 - \frac{1}{3}b\right), & |s| \leq 1 \\ \left(-\frac{1}{6}b - c\right)|s|^3 + (b + 5c)|s|^2 + (-2b - 8c)|s| + \left(\frac{4}{3}b + 4c\right), & 1 < |s| \leq 2 \\ 0, & \text{Otherwise} \end{cases}$$

$$h(s) = \begin{cases} 1, & -d < |s| \leq d \\ 0, & (1-d) \geq s > (1-d) \\ 2\left|\frac{s-d}{1-2d}\right|^3 - 3\left|\frac{s-d}{1-2d}\right|^2 + 1, & \end{cases}$$

$$h(s_x, s_y)_{\theta=0} = \frac{1}{\sqrt{2}}\{h(s_x)_{c=0.5} \cdot h(s_y)_{c=0}\}$$

$$h(s_x, s_y)_{\theta=\pi/2} = \frac{1}{\sqrt{2}}\{h(s_x)_{c=0} \cdot h(s_y)_{c=0.5}\}$$

$$h(s_x, s_y)_{\theta=\pi/4} = \frac{1}{\sqrt{2}}\left\{h\left(\frac{s_x + s_y}{2}\right)_{c=0.5} \cdot h\left(\frac{s_x - s_y}{\sqrt{2}}\right)_{c=0}\right\},$$

$$h(s_x, s_y)_{\theta=3\pi/4} = \frac{1}{\sqrt{2}}\left\{h\left(\frac{s_x + s_y}{\sqrt{2}}\right)_{c=0} \cdot h\left(\frac{s_x - s_y}{2}\right)_{c=0.5}\right\},$$

and wherein h(s) is a modified cubic kernel, $s_x = x/\Delta x$ and $s_y = y/\Delta y$ are re-sampling distances in the horizontal and vertical directions, respectively, and indicates matrix multiplication.

16. The method according to claim 12, wherein the first set of discrete sample values are at a different resolution to the second set of discrete sample values.

17. A computer readable medium for storing a program for an apparatus which processes data, said processing comprising a method of interpolating image data, said program comprising:
   code for accessing a first set of discrete sample values of the image data;
   code for identifying text and regions in the first set of discrete sample values depending on a local contrast indicator associated with each of the discrete sample values of the first set;
   code for identifying edge regions in the first set of discrete sample values depending on an edge strength indicator and an edge direction indicator for each of the discrete sample values of the first set;
   code for combining the text regions and the edge regions to form a kernel selection map;
   code for cleaning the kernel selection map by re-assigning orientations of any edge regions having isolated edge directions occurring in an otherwise uniformly directed local region of the first set of discrete sample values, according to the uniform direction;
   code for calculating kernel values for each of the discrete sample values using one of a plurality of kernels, wherein the one kernel is selected from the plurality of kernels using the cleaned kernel selection map; and
   code for convolving the kernel values with the discrete sample values to provide a second set of discrete sample values.

18. The computer readable medium according to claim 17, wherein the plurality of interpolation kernels are each derived from a universal interpolation kernel, h(s).

19. The computer readable medium according to claim 17, wherein the plurality of kernels are given by:

$$h(s_x, s_y)_{0 \leq \theta \leq \pi/2} = \frac{1}{\sqrt{2}}$$
$$\{h((1 - 2\theta/\pi)s_x + (2\theta/\pi)s_y)_{c=0.5} \cdot h(((2\theta/\pi)s_x + (2\theta/\pi - 1)s_y)w(\theta))_{c=0}\}$$

$$h(s_x, s_y)_{\pi/2<\theta<\pi} = \frac{1}{\sqrt{2}}\{h((2\theta/\pi - 1)s_x + (2\theta/\pi - 2)s_y)_{c=0.5} \cdot$$
$$h(((2\theta/\pi - 2)s_x + (1 - 2\theta/\pi)s_y)w(\theta))_{c=0}\},$$

and wherein h(s) is a universal interpolation kernel, $s_x = x/\Delta x$ and $s_y = y/\Delta y$ are re-sampling distances in the horizontal and vertical directions, respectively, and · indicates matrix multiplication.

20. The computer readable medium according to claim 17, wherein the plurality of kernels are given by:

$$h(s) = \begin{cases} \left(2 - \frac{3}{2}b - c\right)|s|^3 + (-3 + 2b + c)|s|^2 + \left(1 - \frac{1}{3}b\right), & |s| \leq 1 \\ \left(-\frac{1}{6}b - c\right)|s|^3 + (b + 5c)|s|^2 + (-2b - 8c)|s| + \left(\frac{4}{3}b + 4c\right), & 1 < |s| \leq 2 \\ 0, & \text{Otherwise} \end{cases}$$

$$h(s) = \begin{cases} 1, & -d < |s| \leq d \\ 0, & (1-d) \geq s > (1-d) \\ 2\left|\frac{s-d}{1-2d}\right|^3 - 3\left|\frac{s-d}{1-2d}\right|^2 + 1, & \end{cases}$$

-continued $$h(s_x, s_y)_{\theta=0} = \frac{1}{\sqrt{2}}\{h(s_x)_{c=0.5} \cdot h(s_y)_{c=0}\}$$

$$h(s_x, s_y)_{\theta=\pi/2} = \frac{1}{\sqrt{2}}\{h(s_x)_{c=0} \cdot h(s_y)_{c=0.5}\}$$

$$h(s_x, s_y)_{\theta=\pi/4} = \frac{1}{\sqrt{2}}\left\{h\left(\frac{s_x+s_y}{2}\right)_{c=0.5} \cdot h\left(\frac{s_x-s_y}{\sqrt{2}}\right)_{c=0}\right\}$$

$$h(s_x, s_y)_{\theta=3\pi/4} = \frac{1}{\sqrt{2}}\left\{h\left(\frac{s_x+s_y}{\sqrt{2}}\right)_{c=0} \cdot h\left(\frac{s_x-s_y}{2}\right)_{c=0.5}\right\},$$

and wherein h(s) is a modified cubic kernel, $s_x = x/\Delta x$ and $s_y = y/\Delta y$ are re-sampling distances in the horizontal and vertical directions, respectively, and · indicates matrix multiplication.

21. The computer readable medium according to claim 17, wherein the first set of discrete sample values are at a different resolution to the second set of discrete sample values.

* * * * *

UNITED STATES PATENT AND TRADEMARK OFFICE
CERTIFICATE OF CORRECTION

| | | |
|---|---|---|
| PATENT NO. | : 7,054,507 B1 | Page 1 of 3 |
| APPLICATION NO. | : 09/466178 | |
| DATED | : May 30, 2006 | |
| INVENTOR(S) | : Andrew Pater Bradley et al. | |

It is certified that error appears in the above-identified patent and that said Letters Patent is hereby corrected as shown below:

SHEET 2

Figure 2:
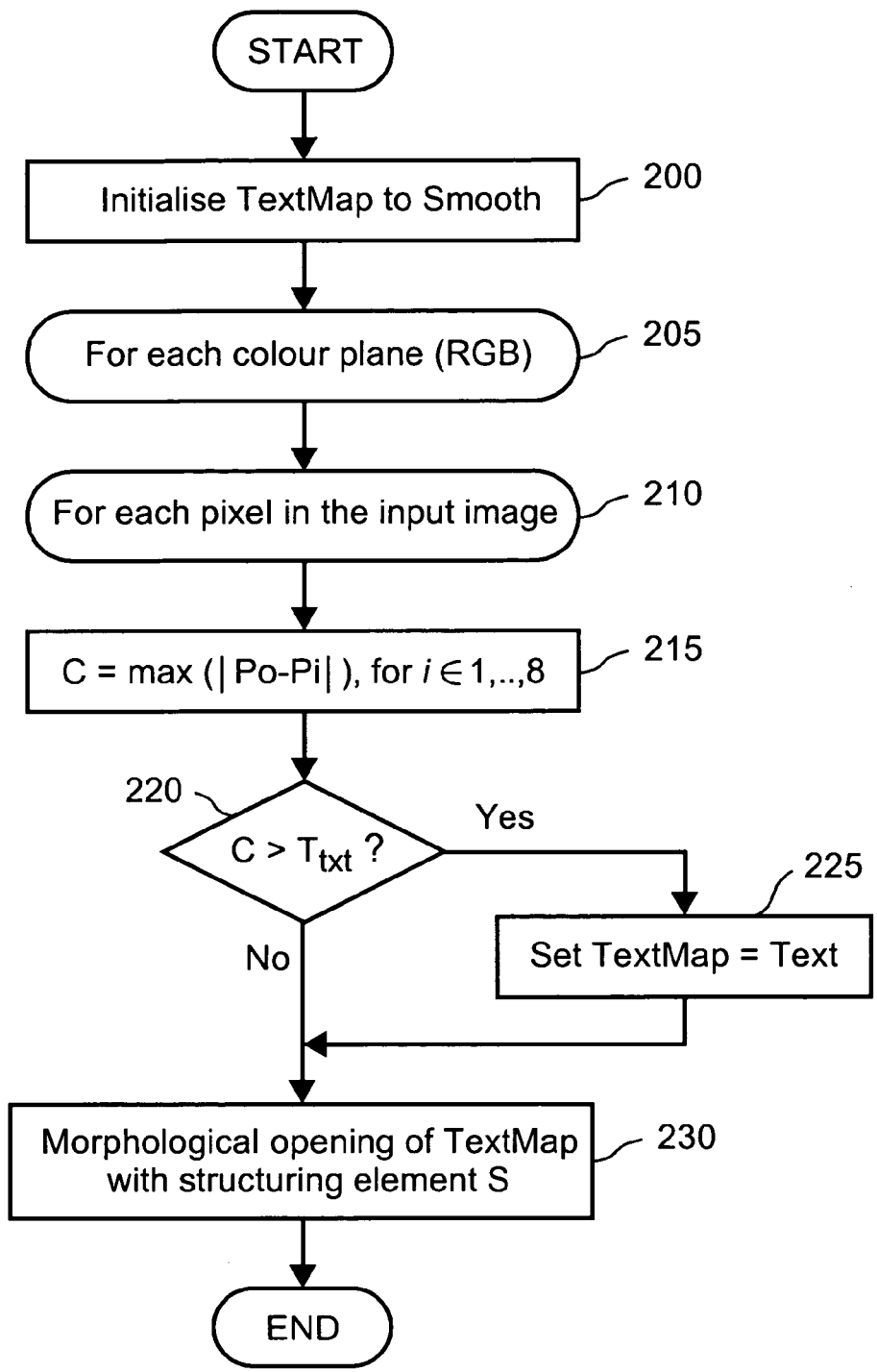
FIG. 2 is a flowchart showing a method of text detection in accordance with the method of interpolation of FIG. 1.

Figure 2, "colour" should read --color--.

SHEET 3

Figure 3:
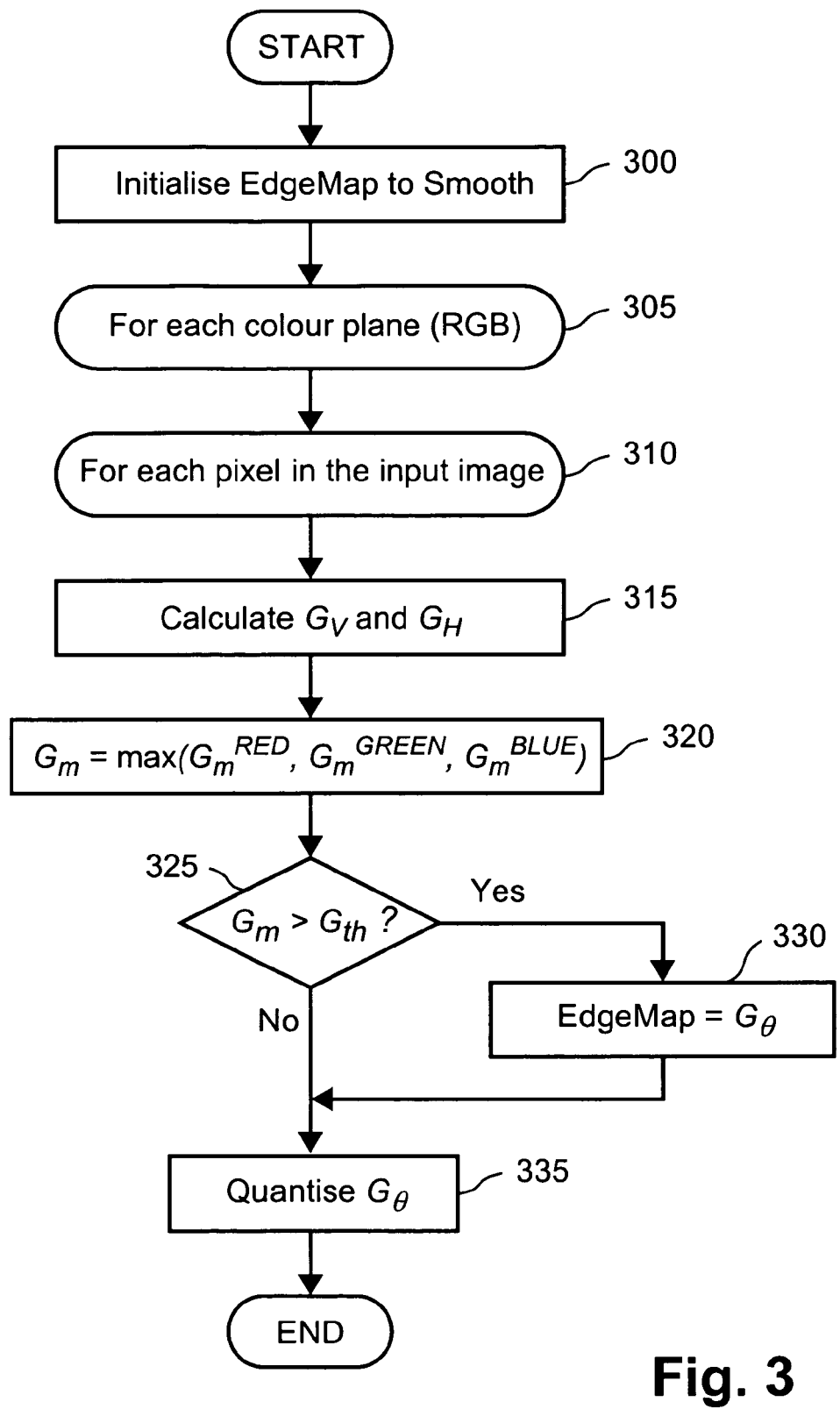
FIG. 3 is a flowchart showing a method of edge strength and orientation detection in accordance with the method of interpolation of FIG. 1.

Figure 3, "colour" should read --color--.

COLUMN 2

Line 14, "B-sp line." should read --B-spline.--.

COLUMN 3

Line 23, "are" should read --is--.

COLUMN 8

Line 16, "(5)" should read --(3)--.

COLUMN 11

Line 27, "Where" should read --where--.
Line 65, "(0)." should read --(θ).--.

COLUMN 12

Line 51, "(IO)" should read --(I/O)--.

UNITED STATES PATENT AND TRADEMARK OFFICE
CERTIFICATE OF CORRECTION

PATENT NO. : 7,054,507 B1
APPLICATION NO. : 09/466178
DATED : May 30, 2006
INVENTOR(S) : Andrew Pater Bradley et al.

It is certified that error appears in the above-identified patent and that said Letters Patent is hereby corrected as shown below:

COLUMN 17

Lines 1-5, $$\text{``} h(S_x, S_y)_{\pi/2 < \theta < \pi} = \frac{1}{\sqrt{2}} \{ h((2\theta/\pi - 1)S_x + (2\theta/\pi - 2)S_y)_{c=0.5} \cdot h(((2\theta/\pi - 2)S_x + (1 - 2\theta/\pi)S_y)w(\theta))_{c=0} \},\text{''}$$

should read $$-- h(S_x, S_y)_{0 \leq \theta \leq \pi/2} = \frac{1}{\sqrt{2}} \{ h((2\theta/\pi - 1)S_x + (2\theta/\pi - 2)S_y)_{c=0.5} \cdot h(((2\theta/\pi - 2)S_x + (1 - 2\theta/\pi)S_y)w(\theta))_{c=0} \}, --.$$

Line 27-37, $$\text{``} h(s) = \begin{cases} 1, & -d < |s| \leq d \\ 0, & (1-d) \geq s > (1-d) \\ 2\left|\frac{s-d}{1-2d}\right|^3 - 3\left|\frac{s-d}{1-2d}\right|^2 + 1, \end{cases} \text{''}$$

should read $$-- h(s) = \begin{cases} 1, -d < s \leq d \\ 0, (1-d) \geq s > (1-d) \\ 2\left|\frac{s-d}{1-2d}\right|^3 - 3\left|\frac{s-d}{1-2d}\right|^2 + 1, \end{cases} --.$$

Line 45-47, $$\text{``} h(S_x, S_y)_{\theta = \pi/4} = \frac{1}{\sqrt{2}} \left\{ h\left(\frac{S_x + S_y}{2}\right)_{c=0.5} \cdot h\left(\frac{S_x - S_y}{\sqrt{2}}\right)_{c=0} \right\}, \text{''}$$

should read $$-- h(S_x, S_y)_{\theta = \pi/4} = \frac{1}{\sqrt{2}} \left\{ h\left(\frac{S_x + S_y}{2}\right)_{c=0.5} \cdot h\left(\frac{S_x - S_y}{\sqrt{2}}\right)_{c=0} \right\} --.$$

Line 53, "and indicates" should read --and · indicates--.
Line 55, "method" should read --apparatus--.

UNITED STATES PATENT AND TRADEMARK OFFICE
CERTIFICATE OF CORRECTION

PATENT NO.       : 7,054,507 B1
APPLICATION NO.  : 09/466178
DATED            : May 30, 2006
INVENTOR(S)      : Andrew Pater Bradley et al.

It is certified that error appears in the above-identified patent and that said Letters Patent is hereby corrected as shown below:

COLUMN 18

Line 56-65, "$h(s) = \begin{cases} 1, & -d < |s| \leq d \\ 0, & (1-d) \geq s > (1-d) \\ 2\left|\dfrac{s-d}{1-2d}\right|^3 - 3\left|\dfrac{s-d}{1-2d}\right|^2 + 1, \end{cases}$" should read -- $h(s) = \begin{cases} 1, -d < s \leq d \\ 0, (1-d) \geq s > (1-d) \\ 2\left|\dfrac{s-d}{1-2d}\right|^3 - 3\left|\dfrac{s-d}{1-2d}\right|^2 + 1, \end{cases}$ --.

Signed and Sealed this

Twenty-eighth Day of November, 2006

JON W. DUDAS
*Director of the United States Patent and Trademark Office*